(12) United States Patent
Martinez (10) Patent No.: US 6,640,446 B2
(45) Date of Patent: Nov. 4, 2003

(54) FLOOR GROOVER

(76) Inventor: Leo Martinez, 6381 Western Ave., Buena Park, CA (US) 90621-2832

(*) Notice: Subject to any disclaimer, the term of this patent is extended or adjusted under 35 U.S.C. 154(b) by 101 days.

(21) Appl. No.: 10/029,051

(22) Filed: Dec. 21, 2001

(65) Prior Publication Data

US 2003/0115760 A1 Jun. 26, 2003

(51) Int. Cl.$^7$ ............................................. B26B 29/06
(52) U.S. Cl. ............................... 30/294; 30/289; 30/290
(58) Field of Search ..................... 60/140, 286, 287, 60/289, 294, 346, 356, 357, 167, 168, 280, 281, 314

(56) References Cited

U.S. PATENT DOCUMENTS

| | | | |
|---|---|---|---|
| 1,882,729 A | * 10/1932 | Avery | |
| 2,757,452 A | * 8/1956 | Barnes | 30/168 |
| 3,176,396 A | * 4/1965 | Straka | 30/168 |
| 3,902,042 A | * 8/1975 | Goldfarb et al. | |
| 4,600,005 A | * 7/1986 | Hendel | 30/167 |
| 5,231,910 A | * 8/1993 | Harsch et al. | 30/294 |
| 5,852,875 A | * 12/1998 | Dolah | 30/113.1 |
| 6,112,417 A | * 9/2000 | Hyer et al. | 30/294 |

FOREIGN PATENT DOCUMENTS

EP  0297684  4/1989

OTHER PUBLICATIONS

Leo Martinez Ent. Promotional Flyer for Turbo Tools.
Janser, Inc. Catalog 103, pp 34 and 35.
Sinclair Equipment Company Catalog, SM 1200 Electric Groover, SM800 Junior Electric Groover, and #11–800 Rolling Groover.

* cited by examiner

Primary Examiner—Hwei-Siu Payer
(74) Attorney, Agent, or Firm—Charles H. Thomas

(57) ABSTRACT

A manually operated floor grooving tool is provided which has opposing front and rear ends with a seam-following roller at its front end and a groove-following roller at its rear end. The tool also employs a pair of grooving blades, one at the front end and one at the rear end. The front grooving blade is inclined upwardly and rearwardly with its cutting tip located just behind the forward axis of rotation of the seam-following guide. The rear-end grooving blade, on the other hand, projects rearwardly from the rear end of the tool and is inclined upwardly and forwardly and behind the groove-following roller. Since the rear-end grooving blade projects beyond the end of the tool in which it is secured, it can complete the formation of the groove all the way up to a vertical abutment. The groove is thereafter filled with sealant in a conventional manner.

15 Claims, 8 Drawing Sheets

FLOOR GROOVER

BACKGROUND OF THE INVENTION

1. Field of the Invention

The present invention relates to a manually operated tool designed for use to create grooves in sheets of flooring to receive melted adhesive welding material therein, and grooving blades having a unique configuration and designed for use in such floor grooving tools.

2. Description of the Prior Art

At present, sheets of homogeneous, elastic, PVC, solid vinyl, linoleum, or other rubberized, plastic, or similar flooring are provided in large rolls which can be unrolled at the job site. Such sheets of flooring are typically utilized in hospitals, particularly in surgical areas, as well as in floors of other types of rooms. Such sheets are also used in other types of public buildings, including industrial and commercial buildings. This type of flooring is sometimes used in residential building construction. Smaller sheets in the form of large tiles, one meter square, are also utilized in the same types of applications.

While in some cases the width of the sheets of the flooring are at least as great as one dimension of the room of the floor to be covered, this is often not the case. In such situations the floor covering can be completed only by positioning and butting together two or more sheets of flooring at their edges.

The flooring sheets are secured to the floor by an adhesive compound. To secure the flooring sheets the compound is applied to the floor and the cut sheets of flooring are laid in position, one by one. Once each sheet of flooring is laid, the next adjacent flooring sheet is brought into position and pressed against the floor with the linear edges of adjacent flooring sheets residing in mutual lateral abutment.

One major problem with laying sheets of flooring in this manner is that the adhesive bond between the underside of the flooring sheets and the subfloor beneath is sometimes inadequate. Quite often areas of the sheets of the flooring will tend to separate from the subfloor when the adhesive bond between the subfloor and the flooring sheets deteriorates due to age, movement of the subfloor, or improper installation.

The separation of areas of flooring sheets from the subfloor is particularly pronounced at the interfaces between adjacent sheets of flooring. The edges of adjacent sheets of flooring which are supposed to reside in firm, mutual abutment, will sometimes tend to rise from the subfloor. This condition presents both a dangerous condition and an unsightly appearance. It also leads to a significant deterioration of the floor because of the separation that occurs when the edges of adjacent sheets of flooring rise. When the edges of sheets of flooring separate from the subfloor in this way, moisture and debris often find their way into the crack that forms between the flooring sheets, thus leading to a further deterioration of the floor. This also creates a condition in which bacteria can thrive, which is highly undesirable in a hospital or kitchen environment.

In the floor installation trade the use of fusible plastics to form a seal between the abutting edges of adjacent sheets of flooring has gained increased popular acceptance. According to one technique the edges of sheets of flooring are not cut perpendicular to the plane of the expanse of the flooring as has historically been the practice. Rather, the edges of the flooring are cut so that adjacent sheets of flooring, when moved into abutting relationship, define an upwardly facing, elongated groove where they meet. A fusible plastic sealant is then laid down in this groove or channel in a molten form and then is allowed to cool. Once the fusible plastic sealant solidifies, it adheres to the abutting edges of the flooring sheets and to the concave or upwardly facing surfaces of the adjacent flooring sheets at the demarcation therebetween.

The fused plastic sealant aids in holding the abutting edges of the adjacent sheets of flooring together and prevents moisture and dirt from entering into the junction between the abutting edges of the flooring sheets. Plastic sealants of this type are colored to blend in with the color of the flooring sheets, in most cases, so that the seams between the adjacent flooring sheets are not readily apparent. The fused plastic sealant thereby serves both as an additional measure of protection of the flooring seams from damage, and also as an aesthetically pleasing manner of concealing seams between adjacent flooring sections.

While cutting of the flooring at an angle to form a groove between adjacent sections of flooring represents one method of creating the groove necessary to receive fusible plastic sealant at seams between flooring sections, other devices exist for creating such grooves as well. There are conventional tools that are utilized to form grooves for receiving plastic sealant at abutting edges between flooring sections. One such tool is sold as the Forbo-Groover, one version of which is illustrated in European Patent No. EP 0 297 684. This tool is a hand-operated device that employs a U-shaped gouge located at or near the rear of the device and guided by a pair of spurs, one located at the forward end of the tool and the other at the rear of the tool. One principal difficulty with this prior, convention tool is that the user is only able to form a groove up to about eighteen centimeters away from a vertical abutment surface, such as a wall or cabinet base. Therefore, the installer is left with a problem in that the final distance of about eighteen centimeters cannot easily be grooved.

A very similar conventional device is sold by Janser, Inc. as the "Wheeled Super Groover". However, this device presents the installer with essentially the same problem. That is, the installer can form a groove only up to about thirteen centimeters from a wall or cabinet. To complete the groove all the way to the vertical surface the installer must utilize a very simple, but imprecise, hand-held grooving blade on a projecting arm. Such a hand-held device offers no guidance and no control over either the depth or straightness of the groove.

Electrically operated grooving machines are also available. For example, Janser, Inc. sells grooving machines of this type as Models TFU 1000 and TFU 600. However, these electrically operated devices are considerably more expensive than hand-operated tools, and can form grooves in flooring only up to about thirty centimeters from the wall or other vertical abutment. Thus, in all cases the installer must finish the job of grooving at the seams with an imprecise, hand-held grooving blade.

SUMMARY OF THE INVENTION

The present invention provides a manually operated tool which is very light in weight and which provides the flooring installer with guidance to form a straight groove of uniform depth at a seam between two abutting sections of flooring. However, unlike prior conventional systems, the tool of the present invention can form the groove all the way up to a wall or other vertical abutment surface. Also, in contrast to prior conventional systems, the grooving tool of the present invention provides a guidance system to ensure the formation of a straight, linear groove while providing a uniform depth of grooving along the entire length of the seam, without leaving any portion of the seam ungrooved.

Furthermore, the utilization of the grooving tool of the invention is not limited to linear seams. To the contrary, the groove tool can be utilized to form grooves to create designs of decorative patterns in the surfaces of sheets of flooring. The tool of the invention can be utilized to form grooves in circular or other types of arcs which are then filled in with a plastic welding material to create aesthetically pleasing designs, patterns, and inlay work. Conventional tools in which the tracking member is located some distance from the grooving blade cannot perform this function adequately. No conventional groover, either electrically or manually operated, can operate satisfactorily in such an application. Such conventional tools are neither designed nor recommended to perform this task.

A further object of the invention is to provide a blade for grooving flooring that has a unique configuration and which creates a clean, sharply delineated groove of uniform cross section. Conventional grooving blades are formed as gouges that have a U-shaped cross section and are inclined upwardly and forwardly relative to the direction of movement of the tool. This configuration is one of the reasons that such blades cannot be forced all the way to the edges of the sheets of flooring that abut vertical surfaces, such as walls and cabinets. Rather, because of its upward and forward inclination, the upper leading structure of conventional grooving blades meets the vertical surface before the lower, trailing portion does. The obstruction between the upper portion of the blade and the wall prevents the cutting edge of the blade from progressing all the way to the wall, whereby the groove is terminated prematurely.

By utilizing a blade having the configuration of the present invention, however, the blade is oriented at in inclination upwardly and to the rear relative to the direction of travel. As a consequence, the cutting edge of the blade can be pushed all the way up to the edges of the sheets of floor covering that meet the vertical obstruction. Consequently, the grooving blade of the invention can be operated throughout the entire length of the seam between adjacent flooring sections.

In one broad aspect the invention may be considered to be a floor groover for creating grooves in sheets of flooring comprising a longitudinally aligned elongated body having front and rear ends and defining a handgrip therebetween; a narrow rotatable seam-following guide mounted at the front end of the body for rotation about a forward axis of rotation perpendicular to the alignment of the body; a rotatable groove-following guide that is wider than the seam-following guide mounted at the rear end of the body for rotation about a rear axis of rotation perpendicular to the alignment of the body and parallel to the forward axis of rotation, whereby the alignment of the seam-following and groove-following guides defines a longitudinal plane perpendicular to the axes of rotation; a metal front-end grooving blade secured to the body and projecting downwardly and forwardly at in inclination therefrom at the underside thereof centered on the longitudinal plane and formed in the shape of a concave, upwardly facing scoop having a forwardly directly cutting edge that is located directly behind the forward axis of rotation of the seam-following guide; and a metal rear-end grooving blade projecting rearwardly from the rear end of the body and downwardly and rearwardly at an inclination relative to the body centered on the longitudinal plane and formed in the shape of a concave, upwardly facing scooping having a rearwardly directed cutting edge that is spaced rearwardly from the groove-following guide and beyond the rear end of the body.

In the operation of the tool of the invention the body of the tool is moved forwardly with the seam-following guide traveling along the demarcation between the abutting sections of floor covering. The engagement of the seam-following guide in the demarcation between the abutting sections of flooring ensures a straight, linear groove. Both the seam-following guide and the groove-following guide are preferably formed as annular projections at the centers of front and rear rollers, which have a cylindrical cross-sectional configuration. The rollers provide lateral support to hold the front-end and rear-end grooving blades in an orientation centered on a vertical plane that follows the demarcation between the abutting sections of flooring and which perpendicular to the floor. The rollers also ensure that the depth of the groove is uniform along the length of the seam.

As the front-end grooving blade creates a shallow groove in the flooring having a generally hemispherical cross section at the abutting sections of flooring, the groove-following guide travels in the groove so formed to prevent the grooving blades from twisting to one side or the other relative to the path of travel. At the end of the seam the front end of the body of the tool will meet a vertical obstruction near the ends of the flooring sections forming the seam only a little more than a centimeter away from those ends. At this point the tool is rotated one hundred eighty degrees about a vertical axis so that the rear end faces the direction of forward travel of the tool. Since the metal rear-end grooving blade projects beyond the rear end of the body, it can be pushed forward in the direction of travel the last remaining centimeter to complete the groove. During this last increment of travel, both the seam-following guide and the groove-following guide ride along the groove already formed behind the tool.

The use of the floor grooving tool is not restricted to the formation of grooves in abutting sheets of flooring. It can also be utilized to form decorative designs and patterns by creating grooves in the upper surface of a single sheet of flooring. In this connection the invention may also be considered to be a floor groover for creating grooves in sheets of flooring comprising: a longitudinally extending body having opposing front and rear ends and an intermediate portion providing a handgrip therebetween; a seam follower mounted to the body at the front end thereof for rotation about a forward axis that lies in a plane perpendicular to the longitudinal alignment of the body, and including a narrow, annular, rotatable seam-following guide; a metal front-end grooving blade defining a longitudinally aligned, concave upwardly facing scooping channel and having an open cutting mouth at its forward tip located directly behind the forward axis, and the front-end scooping blade is secured to the body and is oriented in an upwardly and rearwardly inclined disposition from the narrow, rotatable seam-following guide.

To inscribe a groove on the upper surface of a sheet of flooring and within its perimeter, the rear grooving blade and the groove-following guide are temporarily removed from the rear of the tool body. This allows the free movement of the seam-following guide and the front-end grooving blade to travel along guidelines marked on the surface of the flooring. The front-end grooving blade can thereby be utilized to form grooves along a circular pattern, grooves along an elliptical pattern, and other grooves of more complex geometric shapes upon the surface of a sheet of flooring.

These grooves are then later filled with molten seam welding material of a different color which hardens and adheres to the flooring surface to provide an aesthetically pleasing pattern or a printed legend on the sheet of flooring.

In still another aspect the invention may be considered to be a floor groover blade for creating grooves in sheets of flooring. The blade is comprised of a nose portion forming a metal scoop having a concave upwardly facing channel with an arcuate, concave upwardly facing cutting edge at its extremity and a longitudinally extending anchoring portion for insertion into a floor grooving tool. The cutting edge preferably has a semicircular shape and the scooping channel has a width of at least about three millimeters and no greater than about five millimeters. Sets of floor grooving blades are typically provided as interchangeable elements for the grooving tool in three, four, and five millimeter grooving channel widths.

The invention may be described with greater clarity and particularity by reference to the accompanying drawings.

DESCRIPTION OF THE EMBODIMENTS

FIGS. 1 through 5 illustrate a manually operated floor grooving tool 10 constructed to create grooves 12 in thin, expansive sheets of flooring which are indicated at 14 and 16. FIGS. 1 through 5 and 8 through 11 show how the floor grooving tool 10 creates grooves 12 at seams 18 between the sheets of flooring 14 and 16, which are disposed with straight linear edges residing in abutting relationship to each other.

The floor grooving tool 10 has an elongated, longitudinally extending body 20 about seventeen centimeters in overall length having opposing front and rear ends indicated at 22 and 24, respectively. An intermediate handgrip portion 26 is formed with a raised undersurface and longitudinally extending, elongated, side depressions 28 that receive the fingertips of the user between the front end 22 and the rear end 24 of the body 20.

Figure 5:
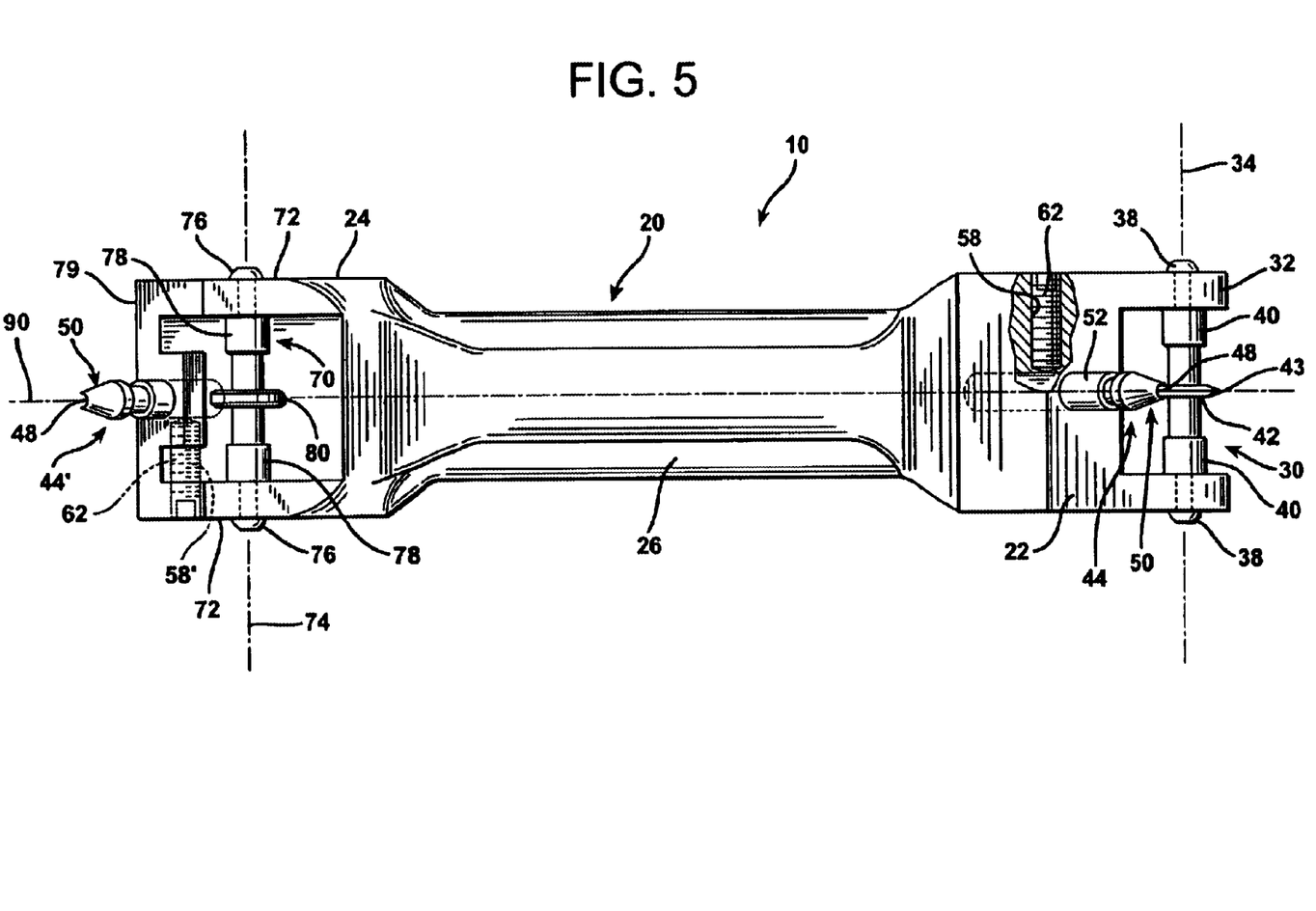
FIG. 5 is a bottom plan view of the grooving tool shown in FIG. 1.

As best shown in FIG. 5, the floor grooving tool 10 is provided with a seam-tracking roller 30 mounted to the front end 22 of the body 20 between a pair of forwardly and downwardly projecting mounting ears 32. The seam-tracking roller 30 is mounted for rotation relative to the body 20 between the mounting ears 32. The forward, transverse axis of rotation of the seam-tracking roller 30 is indicated at 34 in FIG. 5. The forward axis 34 is perpendicular to the direction of travel of the seam-tracking roller 30, which is indicated by the directional arrow 36 in FIG. 1, and perpendicular to the longitudinal alignment of the tool body 20, which is indicated by the plane 90 in FIG. 5.

The seam-tracking roller 30 is preferably formed of metal and has transverse, internal bores in its opposing ends that receive the tips of threaded shanks of allen-head screws 38 that project through the mounting ears 32. The seam-tracking roller 30 has enlarged, cylindrical-shaped portions 40 located just inboard from the mounting ears 32 that make rolling contact with the sheets of flooring 14 and 16 when the tool 10 is operated. The seam-tracking roller 30 is formed at its midpoint with a very narrow, annular, rotatable seam-following guide 42. The seam-following guide 42 is generally disc-shaped, but is tapered at its outer periphery to a circular edge that follows the seam 18 between abutting flooring sections 14 and 16.

Figure 6A:
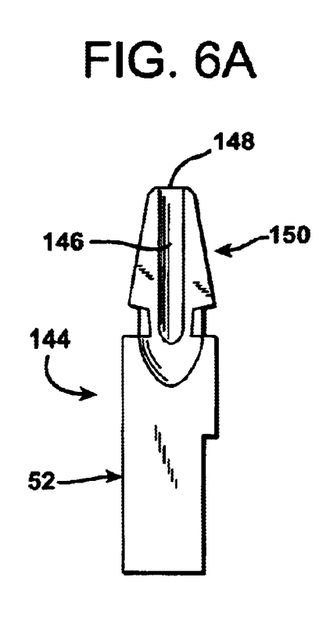
FIG. 6A is a top plan view showing a single one of the blades employed in the tool of FIG. 1 in isolation.
Figure 6B:
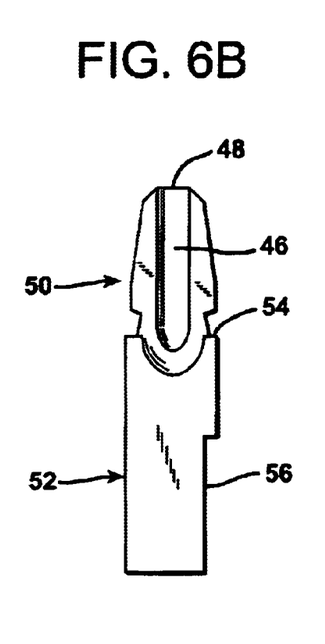
FIG. 6B is a top plan view showing in isolation an alternative embodiment of a blade adapted for use in the tool of FIG. 1.

The floor grooving tool 10 also includes a metal front-end grooving blade 44 defining a longitudinally aligned, concave upwardly facing scooping channel 46, which is best illustrated in the isolated view of the metal grooving blade 44 illustrated in FIG. 6B. As illustrated in FIGS. 5 and 6B the front-end grooving blade 44 defines a concave, semicircular cutting edge 48 at its forward tip. The cutting edge 48 is located directly behind the portion of the seam-following guide 42 that resides in the seam 18 as the tool 10 is operated and directly behind the forward axis of rotation 34.

The front-end grooving blade 44 has a nose portion 50 and an anchoring portion 52, which are delineated from each other by a neck that defines a shoulder 54. The anchoring portion 52 has a generally cylindrical configuration, but is formed with one flat side surface 56. The front end 22 of the tool body 20 includes an internally threaded tapped bore 58 that extends perpendicular to the alignment of the tool body 20 and which is formed in one of the side walls of the front end 22 behind the mounting ears 32.

The front end 22 is also formed with an upwardly and rearwardly inclined cylindrical blade mounting socket 60 having a diameter that snugly receives the anchoring end 52 of the front-end grooving blade 44. However, the fit is loose enough to permit longitudinal movement of the anchoring end 52 of the front-end grooving blade 44 within the blade mounting socket 60 to allow adjustment of the position of the blade 44 within the blade mounting socket 60. This allows the depth of the groove 12 formed in the sheets of flooring 14 and 16 to be adjusted.

When the front-end cutting blade 44 is at the proper position to achieve a groove 12 of desired depth, a steel allen-head set screw 62 is fully advanced into the internally tapped set screw hole 58 to bear against the flat surface 56 of the blade-anchoring portion 52 of the blade 44. The flat surface 56 of the anchoring portion 52 is aligned parallel to the alignment of the scooping channel 46 and parallel to the plane 90 of alignment of the tool body 20. The longitudinal plane 90 bisects the scooping channel 46 so that when the set screw 62 is tightened, the scooping channel 46 will be centered on the same plane 90 which bisects the outer circular edge 43 of the seam-following guide 42. When the anchoring portion 52 of the front-end grooving blade 44 is inserted into the blade mounting socket 60 and the set screw 62 is tightened, the front-end grooving blade 44 is oriented in an upwardly and rearwardly inclined disposition directly behind the forward transverse axis of rotation 34 of the seam-following roller 30.

The grooving tool 10 also includes a groove-tracking roller 70 which is mounted to the rear end 24 of the tool body 20 between a pair of rear-end mounting ears 72. The groove-tracking roller 70 is mounted for rotation about a rear transverse axis of rotation 74 that is perpendicular to the plane 90 and perpendicular to the direction of travel 36 of the groove-tracking roller 70. A pair of internal bores are defined in the ends of the groove-tracking roller 70 to receive the tips of the threaded shanks of allen-head mounting screws 76. The screws 76 pass through the rear mounting ears 72 to mount the groove-tracking roller 70 to the tool body 20 for rotation about the rear transverse axis 74.

Figure 1:
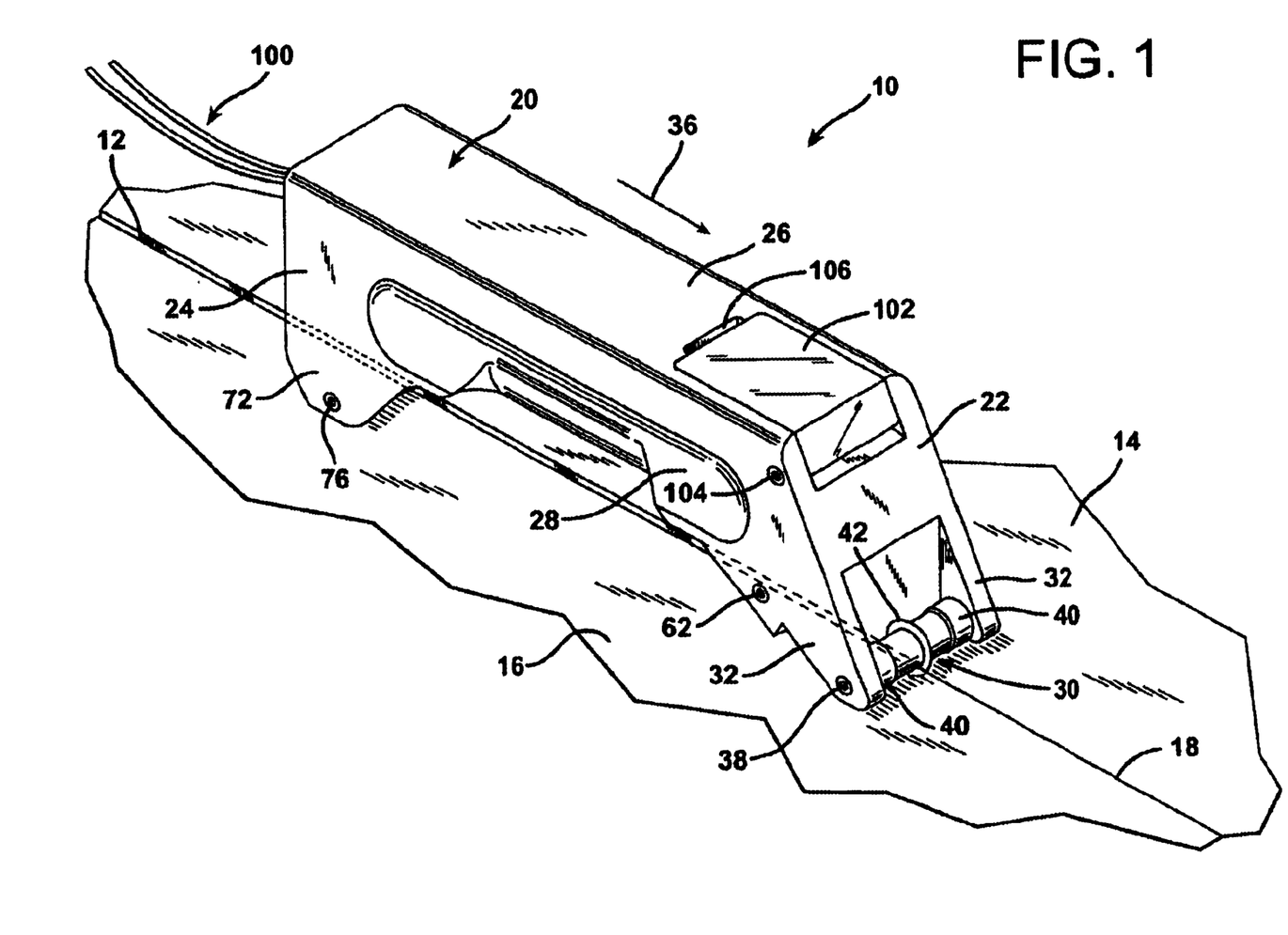
FIG. 1 is a perspective view illustrating a floor grooving tool according to the invention being utilized to create a groove along a seam of abutting sheets of flooring.

The groove-tracking roller 70 includes enlarged cylindrical portions 78 that make contact with the flooring sheets 14 and 16 when the grooving tool 10 is moved along the seam 18 as illustrated in FIG. 1. The groove-tracking roller 70 is formed with a generally disc-shaped groove-tracking guide 80 at its midpoint that has a width suitable to fit into the groove 12 formed by the front-end grooving blade 44. The width of the groove-tracking guide 80 is greater than the width of the seam-following guide 42. The peripheral edges of the generally disc-shaped groove-tracking guide 80 are slightly tapered so as to aid in centering the groove-tracking guide 80 in the groove 12 as the tool 10 is moved in the direction of travel 36.

The grooving tool 10 also includes a metal rear-end grooving blade 44' that is identical in construction to the front-end grooving blade 44 and differs only in its location on the tool 10. The blades 44 and 44' are identical and interchangeable with each other. Like the front-end grooving blade 44 the rear-end grooving blade 44' defines a longitudinally aligned, concave upwardly facing scoop 46 having a concave, semicircular cutting edge 48 at its lower tip. The rear-end grooving blade 44' is located behind the groove-following guide 80. The anchoring portion 52 of the rear-end grooving blade 44' fits snugly into an upwardly and forwardly inclined cylindrical blade mounting socket 60' defined in the rear end 24 of the tool body 20.

Figure 3:
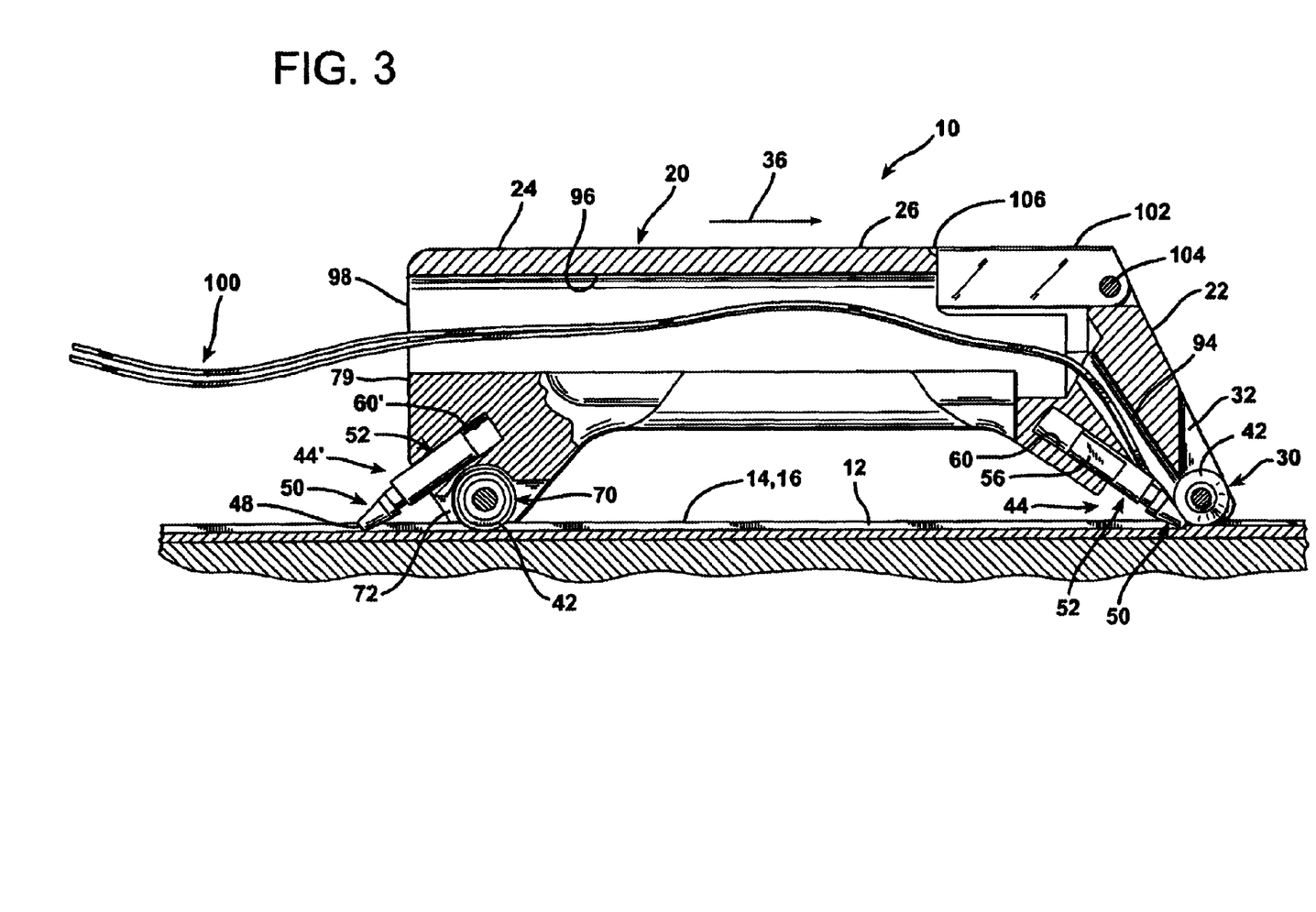
FIG. 3 is a sectional elevational view of the tool of FIG. 1 shown as moving in a direction of travel and as oriented throughout the greater portion of the seam.
Figure 4:
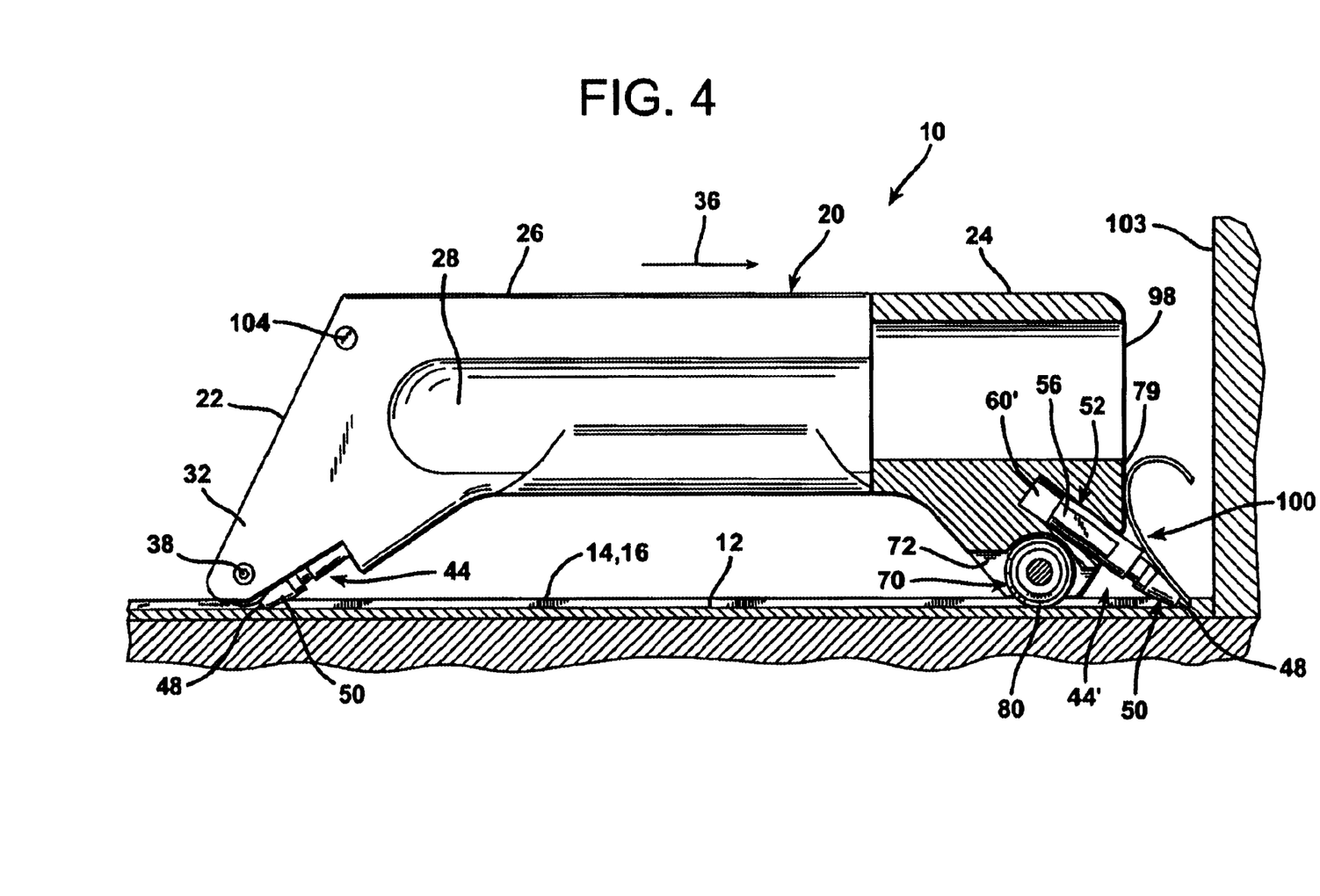
FIG. 4 illustrates the tool of FIG. 1 reversed in orientation relative to the direction of travel so as to complete the groove all the way up to an abutting obstruction.

As illustrated in FIG. 5, the rear-end grooving blade 44' is held rigidly in position by a set screw 62' that is engaged in an internally tapped bore 58' directed into the side wall of the tool body 20 at the rear end 24 thereof forward of the rear mounting ears 72. The internally tapped set screw-engaging bore 58' is identical to the set screw bore 58, except for its position in the rear end 24 and on the opposite side of the tool body 20. The set screw 62' is likewise identical to the set screw 62. The set screw 62' thereby secures the rear-end grooving blade 44' to the tool body 20 oriented in an upwardly and forwardly inclined disposition behind the rear transverse axis of rotation 74, as illustrated in FIG. 3. The cutting edge 48 of the rear-end grooving blade 44' faces concave upwardly and projects rearwardly beyond the rear extremity of the rear end 24 of the tool body 20, as illustrated in FIGS. 3, 4, and 5.

As illustrated in FIG. 5, the longitudinally extending tool body 20 is symmetrically formed about the vertical plane 90 that bisects the tool body 20. With the exception of the set screw seating wells 62 and 62', the component portions of the tool body 20 residing on the opposing sides of the longitudinally extending vertical plane 90 are mirror images of each other. The tool blade mounting sockets 60 and 60' are centered on the vertical plane 90, as are the seam-following guide 42, the groove-following guide 80 and the front and rear-end grooving blades 44 and 44'. The cross sections at the centers of the seam-following guide 42 and the groove-following guide 80 may be considered to define the longitudinal plane 90. The transverse forward axis of rotation 34 and the transverse rear axis of rotation 74 are both perpendicular to the vertical plane 90 of longitudinal alignment of the tool body 20.

Preferably, and as illustrated, the seam-tracking roller 30, the groove-tracking roller 70, and both of the grooving blades 44 and 44' are removably attached to the elongated body 20. Both of the grooving blades 44 and 44' are secured to the tool body 20 by means of the set screws 62 and 62' as illustrated. The rollers 30 and 70 and the grooving blades 44 and 44' are detachable from the body 20 by removal of their respective mounting screws 38 and 76.

The front-end and rear-end grooving blades employed in the tool 10 are preferably provided as interchangeable sets of grooving blades. In FIGS. 1–5 grooving blades 44 and 44' having the configuration depicted in FIG. 6B are provided and are adapted for alternative securement to the tool body 20 in an interchangeable manner with other sets of grooving blades, such as those having the configurations shown in FIGS. 6A and 6C. The semicircular cutting edge 48 and the longitudinally aligned scooping channel 46 of the grooving blades 44 and 44' has a cross-sectional diameter of four millimeters, which is one of the standard sizes of plastic welding rods utilized in seam welding tools, such as those illustrated in prior U.S. Pat. No. 5,656,126. This patent is incorporated herein in its entirety by reference. The alternative grooving blade 144 illustrated in FIG. 6A has an anchoring portion 52 identical to that of the grooving blade 44, but has a narrower semicircular cutting edge 148 and a narrower concave upwardly facing scooping channel 146. Specifically, the cutting edge 148 and the scooping channel 146 both have a width of three millimeters, which is the size of the welding rods used in some seam welding devices.

Figure 6C:
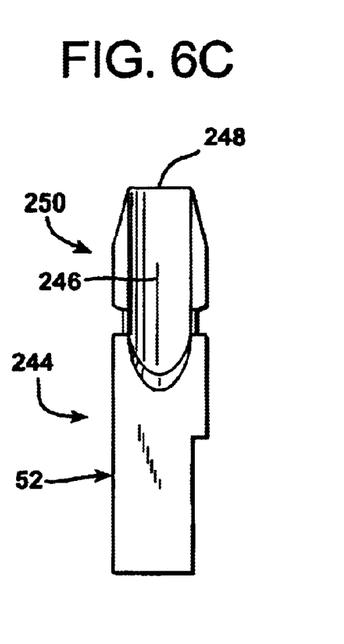
FIG. 6C is a top plan view showing in isolation still another alternative embodiment of a blade adapted for use in the tool of FIG. 1.

Similarly, the grooving blade 244 illustrated in FIG. 6C has an anchoring portion 52 with dimensions identical to those of the anchoring portions 52 of the grooving blades 44 and 144 illustrated respectively in FIGS. 6B and 6A. The semicircular cutting edge 248 of the blade 244 has a diameter of five millimeters and the scooping channel 246 of the blade 244 is also five millimeter in width. This dimension accommodates another standard size of welding rod used in commercially available floor seam welding devices.

The grooving blades 44, 144, and 244 may be utilized interchangeably with each other since their anchoring portions 52 are of identical dimensions and are adapted to fit interchangeably into the grooving blade mounting sockets 60 and 60' in the tool body 20. The selection of the blade configuration shown in FIGS. 6A, 6B, or 6C is determined by the user, depending upon the size of floor seam welding rod to be utilized to fill the groove 12. Each of the front-end grooving blades 44, 144, and 244 has a different width scooping channel 46, 146, and 246. The blades 44, 144, and 244 are selected in pairs for use with the grooving tool 10 for a particular job, with one of the blades being mounted at the front end 22 of the tool body 20, while the other identical grooving blade is mounted at the rear end 24, as illustrated in FIG. 3.

Pairs of identical grooving blades 44, 144, or 244 are selected in alternation for detachable mounting to the tool body 20 in the manner previously described. Consequently, depending upon the blade configuration of FIG. 6A, FIG. 6B, or FIG. 6C selected, each of the rear-end grooving blades will have a scooping channel width that matches that of the front-end grooving blade 44, 144, or 244 with which it is paired.

Each of the scooping channels 46, 146, and 246 has a uniform width from the cutting edge of the grooving blade in which it is formed over at least three-quarters of the length of the nose portion 50, 150, or 250 of the cutting blade in which it is defined. In the preferred embodiments of FIG. 6A, FIG. 6B, and FIG. 6C, the scooping channels 46, 146, and 246 have a uniform width throughout nearly their entire lengths. The scooping groove 46 is about one and one quarter centimeters in length. The scooping groove 146 is about one centimeter in length while the scooping groove 246 is about one and a half centimeters in length. The depths of the scooping groove 46, 146 and 246 decrease at the rear extremities of those grooves.

As illustrated in FIG. 3, the tool body 20 is hollow and defines an internal material-channeling duct 94 having a cylindrical cross section of about fifteen millimeters in diameter. The channeling duct 94 is inclined at a steeper angle to the horizontal surfaces of the flooring sections 14 and 16 than the blade mounting socket 60. The channeling duct 94 leads upwardly and rearwardly from the scooping channel 46, 146, or 246 of the front-end grooving blade 44, 144, or 244 selected. The channeling duct 94 intersects an internal, longitudinal, horizontally oriented discharge cavity 96, also having a cylindrical cross section. The diameter of the discharge cavity 96 is preferably about twenty-five millimeters. The internal, longitudinal, cylindrical discharge cavity 96 extends from a blind end that intersects the material-channeling duct 94 at the front end 22 of the tool body 20 all the way to the transverse, rear end surface 79 of the rear end 24 of the tool body 20, where it forms a discharge opening 98 therein.

Figure 2:
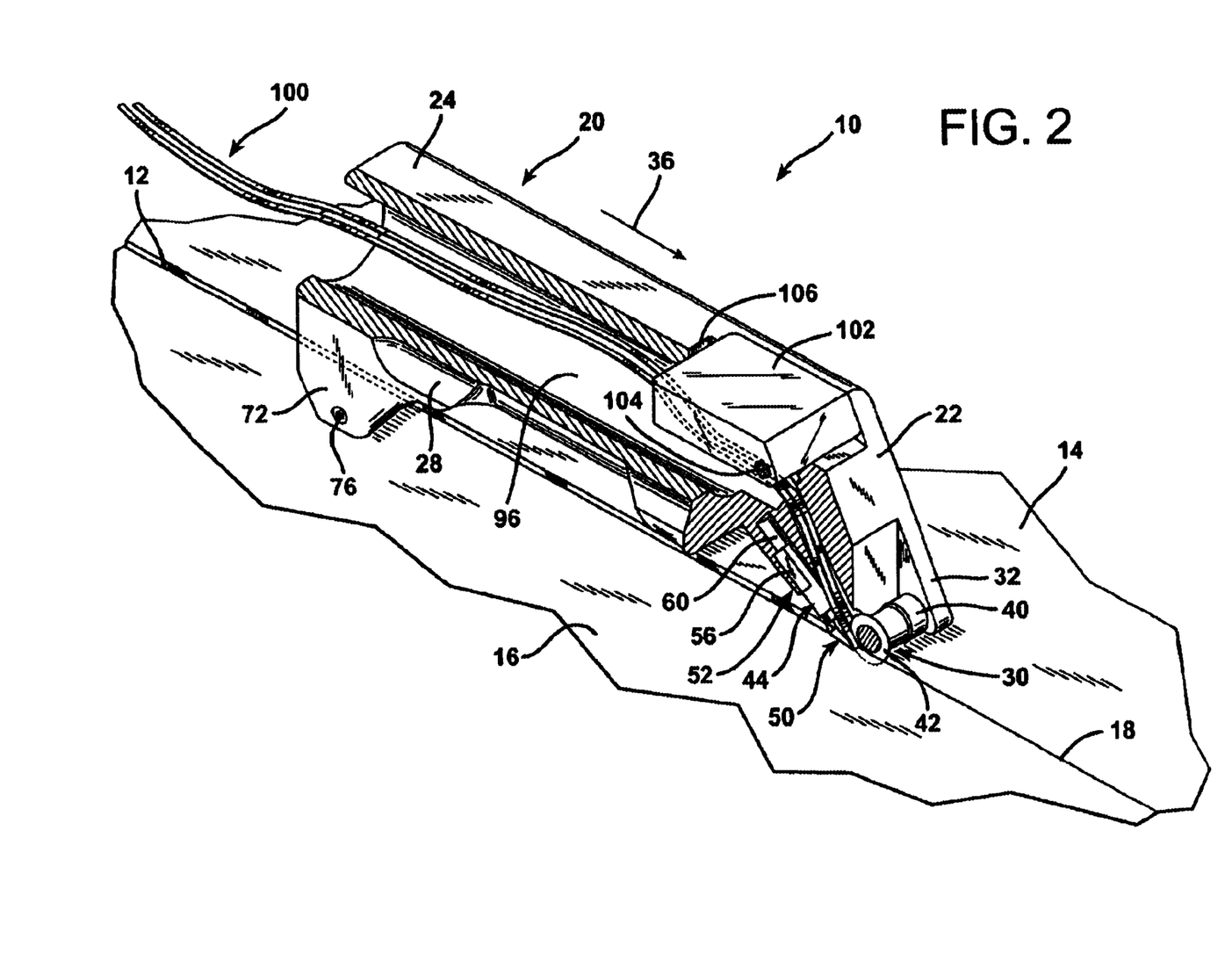
FIG. 2 is a perspective view of the tool of FIG. 1 shown partially broken away so that internal features of the tool are visible.
Figure 7:
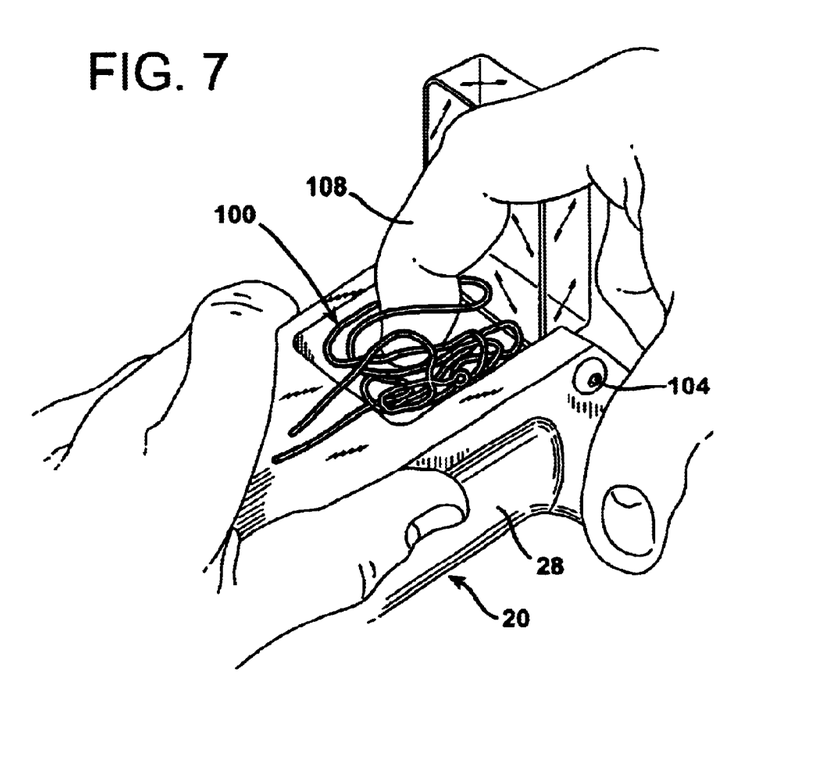
FIG. 7 illustrates the manner of clearing clogged strips of flooring material from the interior of the tool of FIG. 1.

As illustrated in FIGS. 2 and 3, the material-channeling duct 94 and the longitudinal discharge cavity 96 are provided to channel and direct the longitudinal discharge cuttings 100 up from the surfaces of the sheets of flooring 14 and 16 and out of the way. Occasionally, the cuttings 100 might become jammed up within the tool body 20, particularly at the intersection between the material-channeling duct 94 and the discharge cavity 96. For this reason the tool body 20 is provided with a plastic, transparent, hinged window 102 that is rotatably secured to the top of the front end 22 of the tool body 20 by allen-head hinge pin pivot screws 104. A fingernail recess 106 is provided in the upper surface of the intermediate handgrip portion 26 of the tool body 20 at the edge of the transparent window 102 remote from the hinge pins 104. This allows a user to insert the fingernail of the forefinger 108 and lift the hinged window 102 to clear jammed cuttings 100 from within the hollow discharge cavity 96, as illustrated in FIG. 7.

The groove-following guide 80 will always have a greater width than the seam-following guide 42 since the groove-following guide 80 will ride longitudinally in the groove 12 that is formed by the front-end grooving blade 44. The groove following guide is three, four, or five centimeters wide, depending upon the width of the scooping channel of the grooving blades utilized. In contrast, the edge 43 of the seam-following guide 42 must be narrow enough to engage the very narrow seam 18 between the closely abutting sections of flooring 14 and 16.

To utilize the floor grooving tool 10, the user first selects a pair of identical grooving blades, both of which will have, alternatively, the blade configuration illustrated in FIG. 6A, FIG. 6B, or FIG. 6C. An alien wrench is then utilized to loosen the allen-head set screws 62 and 62' so as to allow removal of any different size cutting blades that may already be secured to the body 20 of the tool 10 and to allow insertion of the anchoring portions 52 of the selected grooving blades into the grooving blade mounting sockets 60 and 60'. It is necessary to remove the seam-tracking roller 30 to allow insertion and removal of the front-end grooving blade 44, 144, or 244, since the seam-tracking roller 30 will obstruct insertion of the front-end grooving blade into the front-end blade mounting socket 60 unless it is removed.

Once the front and rear-end grooving blades have been inserted into their respective mounting sockets 60 and 60', the front end seam-tracking roller 30 is replaced. The front and rear-end grooving blades are then adjusted in rotation within their respective mounting sockets 60 and 60' so that the flat surfaces 56 of the anchoring portions 52 face the set screw bores 58 and 58'. The blades are then longitudinally positioned within their respective mounting sockets 60 and 60' so that both the front and rear-end grooving blades just touch the surfaces of the sections of flooring 14 and 16, but do not extend beyond the seam-following guide 42 and the groove-tracking guide 80.

The seam-following guide 42 projects radially outwardly from the seam-tracking roller 30 upon which it is formed a distance equal to the depth of the groove 12 to be formed. Therefore, to properly position the front and rear grooving blades, the cutting edges of the blades should make contact with a flat floor surface at the same time that the seam-following guide 42 and the groove-following guide 80 contact the floor surface. Once the front-end and rear-end cutting blades are properly positioned, the allen-head set screws 62 and 62' are tightened to firmly secure the grooving blades in position.

The tool 10 is then ready for use. Throughout most of the length of the seam 18, the tool 10 is employed as illustrated in FIGS. 1, 2, and 3 and is moved in the direction of travel 36 while in the orientation shown in those drawing figures. When used in this manner, the front seam-tracking roller 30 is pressed firmly down onto the flooring sections 14 and 16 so that the seam-following guide 42 is laterally constrained to follow the seam 18. The tool 10 is then pushed forward in the direction of travel 36 to create the groove 12. If the front-end grooving blade 44 and rear-end grooving blade 44' have been selected, the front cutting edge 48 of the front-end cutting blade 44 will cut into the upper surfaces of the sections of flooring 14 and 16 on either sides of the seam 18 so that as the tool 10 is pushed forward in the direction indicated at 36, two strips of cuttings 100 will start to flow up into the material-channeling duct 94 and then through the hollow tool body 20 and along the longitudinal discharge cavity 96. Contact between the roller portions 40 of the seam-tracking roller 30 and the flooring sections 14 and 16 will limit and control the depth of the groove 12. The cuttings 100 are discharged from the tool body 20 through the discharge opening 98 in the rear end 24 of the tool body 20.

If during the course of forming the groove 12 the cuttings 100 become jammed within the tool body 20, the hinged, transparent window 102 may be lifted and the bunched cuttings 100 removed as illustrated in FIG. 7. Once the jammed cuttings 100 have been dislodged, the window 102 is closed and the use of the tool continues as illustrated in FIGS. 1–3.

The tool 10 is operated in this manner along the entire length of the seam 18 until the tips of the mounting ears 32 at the front end 22 of the tool body 20 reach an abutting vertical surface, such as a vertical wall or cabinet 103 illustrated in FIG. 4. When this occurs the groove 12 will have been formed in the wake of the front-end cutting blade 44 up to within only about twelve centimeters of the vertical abutment 103.

Figure 8:
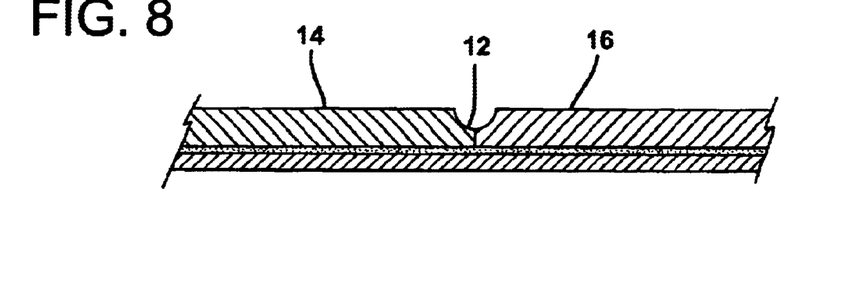
FIG. 8 is a cross-sectional view illustrating a groove formed along a seam of adjacent sheets of flooring.

At this point the front end 22 of the tool body 20 is lifted at a sharp angle to cut off the trailing strips of cuttings 100. The tool 10 is then turned end for end so that the rear end 24 of the tool body 20 faces the vertical abutment 103, as illustrated in FIG. 4. At this point the groove-tracking guide 80 is placed in the groove 12 previously formed by the front-end blade 44 and the seam-following guide 42 is likewise placed in the groove 12 well behind the groove-following guide 80. In this orientation the cutting edge 48 of the rear-end grooving blade 44' will project outwardly from the rear end face 79 of the rear end 24 of the tool body 20 in the direction of travel 36. The tool 10 is then again pushed in the same forward direction of travel 36 in which it had been used to form the major portion of the groove 12, but this time with the rear end 24 directed toward the vertical wall 103. The rear-end grooving blade 44' thereupon grooves out the short section of the groove 12 the remaining distance to the vertical abutment 103. As a consequence, the grooving tool 10 can be utilized to form the entire length of the groove 12. The cross section of the groove 12 will then appear throughout as illustrated in FIG. 8.

Figure 9:
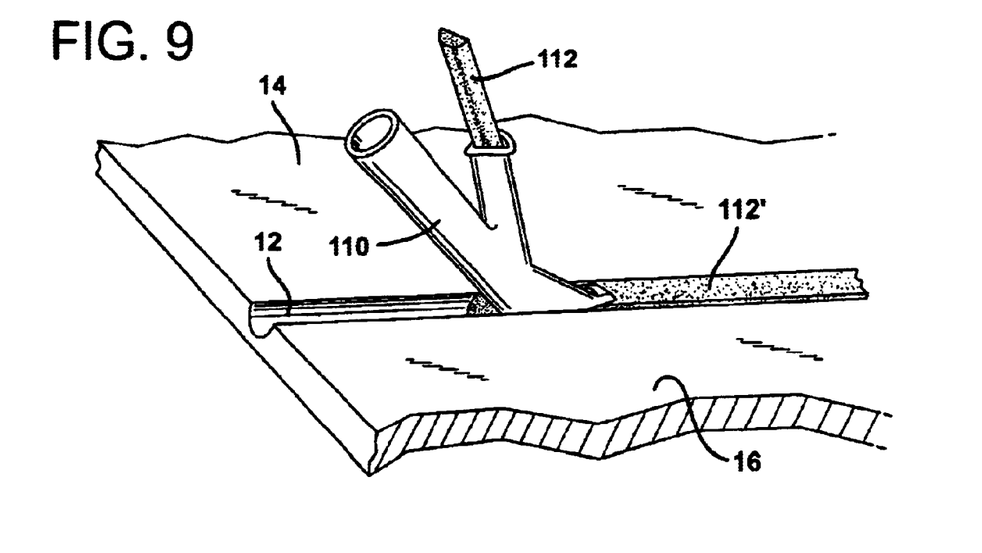
FIG. 9 is a perspective view illustrating the manner in which plastic welding material is utilized to fill the groove of FIG. 8.

Thereafter, a seam-sealing tool is utilized to fill the groove 12 with sealant as described in prior U.S. Pat. No. 5,656,126. The tip 110 of such a tool is illustrated in FIG. 9 dispensing a welding rod 112 which is heated in the tip 110 as described in U.S. Pat. No. 5,656,126. It is to be understood that the entire tool described in that prior patent must be utilized in conjunction with the heating tip 110, but the tool is not shown in FIG. 9 to simplify the illustration of that drawing figure.

Figure 10:
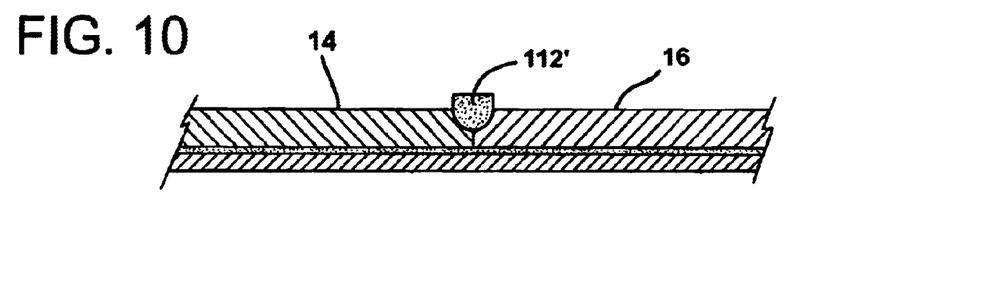
FIG. 10 is a cross-sectional view illustrating a groove filled as shown in FIG. 9.
Figure 11:
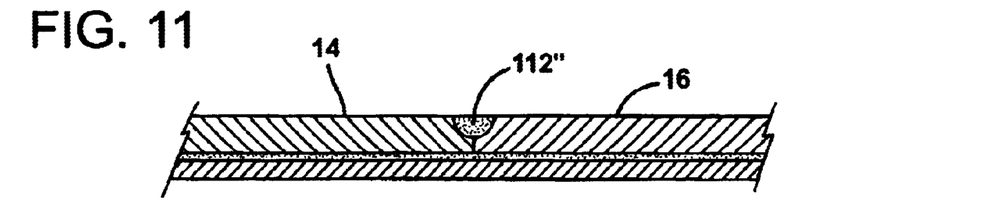
FIG. 11 illustrates the filled groove of FIG. 10 after excess filling material has been trimmed away.

As the welding rod 112 is heated within the tip 110, it emerges in molten form as a seam filler 112', illustrated in FIGS. 9 and 10. The seam filling 112', when originally dispensed, will project upwardly a short distance above the flat, horizontal surface level of the sheets of flooring 14 and 16, as illustrated in FIG. 10. A conventional floorer's skiving tool is then use to skive or trim the excess material off of the solidified seam filling 112' down to the precise level of the floor sections 14 and 16, as illustrated at 112" in FIG. 11.

Figure 12:
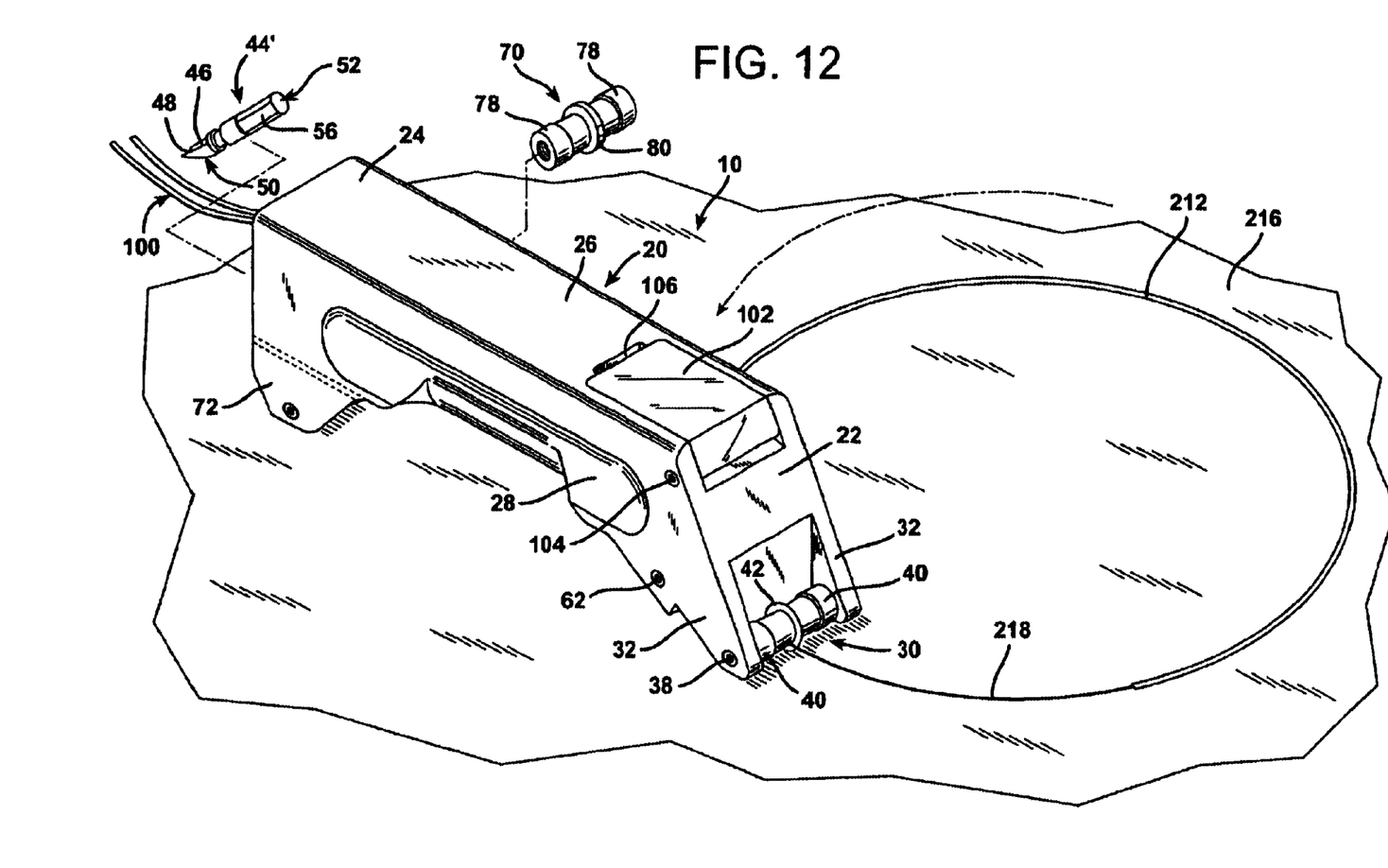
FIG. 12 illustrates the tool of FIG. 1 as utilized for forming decorative grooves on the upper surface of a sheet of flooring.

Undoubtedly, numerous variations and modifications of the invention may be employed without departing from the scope of the invention. For example, the tool 10 may be utilized to form decorative grooves 212 in a sheet of flooring 216 as illustrated in FIG. 12. In such a situation, there is typically a pattern line 218 which may either be drawn onto the surface of the flooring 216, or inscribed as a shallow indentation into that surface. The pattern line 218 provides the user of the tool 10 with a guide path for forming the groove 212. The tool 10 can be used to groove circles or curves having a radius as small as about one hundred fifty centimeters.

To form curved grooves in this manner it is necessary to remove the groove-tracking roller 70 and the rear-end grooving blade 44' from the tool body 20 by loosening the screws 76 and 62', as indicated in FIG. 12. With the rear-end groove-tracking roller 70 and the rear-end grooving blade 44' removed, the front-end seam-tracking roller 30 is pressed against the surface of the flooring 216 with the seam-following guide 42 engaged in the prescored path 218. The user should employ both hands to guide and steady the tool 10 when it is employed in the manner illustrated in FIG. 12. Once the decorative groove 212 has been formed, the groove-tracking roller 70 and the rear-end grooving blade 44' are replaced in the manner previously described.

Undoubtedly, numerous variations and modifications of the invention will become readily apparent to those familiar with flooring installation tools and equipment. Accordingly, the scope of the invention should not be construed as limited to the embodiments described herein, but rather is defined in the claims appended hereto.

I claim:

1. A floor groover for creating grooves in sheets of flooring comprising:

a longitudinally aligned elongated body having front and rear ends and defining a handgrip therebetween, a narrow, rotatable seam-following guide mounted at said front end of said body for rotation about a forward axis of rotation perpendicular to the alignment of said body, a rotatable groove-following guide that is wider than said seam-following guide mounted at said rear end of said body for rotation about a rear axis of rotation perpendicular to the alignment of said body and parallel to said forward axis of rotation, whereby the alignment of said seam-following and groove-following guides defines a longitudinal plane perpendicular to said axes of rotation, a metal front-end grooving blade secured to said body and projecting downwardly and forwardly at an inclination therefrom at the underside thereof centered on said longitudinal plane and formed in the shape of a concave upwardly facing scoop having a forwardly directed cutting edge that is located directly behind said forward axis of rotation of said seam-following guide, and a metal rear-end grooving blade projecting rearwardly from said rear end of said body and downwardly and rearwardly at an inclination relative to said body centered on said longitudinal plane and formed in the shape of a concave upwardly facing scoop having a rearwardly directed cutting edge that is spaced rearwardly from said groove-following guide and beyond said rear end of said body.

2. A floor groover according to claim 1 wherein both of said blades are removably attached to said elongated body.

3. A floor groover according to claim 2 wherein both of said blades are secured to said body by means of set screws.

4. A floor groover according to claim 2 wherein said elongated body is hollow and has a material-channeling duct leading upwardly and rearwardly from said seam-following guide and an enlarged, longitudinal material discharge cavity with a discharge opening at said rear end of said body.

5. A floor groover according to claim 4 further characterized in that said material-channeling duct intersects said material discharge cavity within said front end of said body, and further comprising a clearing access opening in said body for use in clearing material that passes from said material-channeling duct into said material discharge cavity.

6. A floor groover according to claim 1 wherein said seam-following guide and said groove-following guide are respectively formed on a seam-tracking roller that is rotatably mounted to said front end of said body and a groove-tracking roller that is rotatably mounted to said rear end of said body.

7. A floor groover according to claim 6 wherein said groove-tracking roller and said rear-end grooving blade are detachable from said body.

8. A floor groover for creating grooves in sheets of flooring comprising:

a longitudinally extending body having opposing front and rear ends and an intermediate portion providing a handgrip therebetween, a seam follower mounted to said body at said front end thereof for rotation about a forward axis that lies in a plane perpendicular to the longitudinal alignment of said body and including a narrow, annular, rotatable seam-following guide, and a metal front-end grooving blade defining a longitudinally aligned, concave upwardly facing scooping channel and having an open cutting mouth at its forward tip located directly behind said forward axis and said front-end grooving blade is secured to said body and is oriented in an upwardly and rearwardly inclined disposition from said narrow, rotatable seam-following guide.

9. A floor groover according to claim 8 wherein said body is hollow and defines an internal material-channeling duct leading upwardly and rearwardly from said scooping channel and an internal, longitudinal discharge cavity that intersects said material-channeling duct and extends rearwardly therefrom to a discharge opening in said rear end of said body.

10. A floor groover according to claim 9 further comprising:

a groove follower removably mounted to said rear end of said body for rotation about a rear axis parallel to said forward axis and including an annular groove-following guide that is wider than said seam-following guide, and a metal rear-end grooving blade defining a longitudinally aligned, concave upwardly facing scooping channel and having an open cutting mouth, and said rear-end grooving blade is removably secured to said rear end of said body at an upward and forward inclination relative to said groove follower with said open cutting mouth projecting beyond said rear end of said body and residing in longitudinal alignment with said groove-following guide at a location spaced rearwardly therefrom.

11. A floor groover according to claim 10 further comprising a plurality of interchangeable front-end grooving blades each adapted for alternative securement to said body as aforesaid, wherein each of said front-end grooving blades has a different width scooping channel and a plurality of interchangeable rear-end grooving blades each adapted for alternative securement to said body as aforesaid, wherein each of said rear-end grooving blades has a different width scooping channel.

12. A floor groover according to claim 11 including front-end grooving blades having scooping channel widths of three, four, and five millimeters and rear-end grooving blades having scooping channel widths of three, four, and five millimeters.

13. A floor groover for cutting grooves in sheets of flooring at seams between abutting sheets of flooring comprising:

a longitudinally extending body having opposing front and rear ends and an intermediate portion providing a handgrip between said front and rear ends, a seam-tracking roller mounted to said front end of said body for rotation about a forward transverse axis of rotation that is perpendicular to the direction of travel of said seam-tracking roller and said seam-tracking roller includes a narrow, annular, rotatable seam-following guide, a metal front-end grooving blade defining a longitudinally aligned, concave upwardly facing scoop and defining a concave cutting edge at its forward tip located directly behind said forward transverse axis, and said front-end grooving blade is secured to said body and is oriented in an upwardly and rearwardly inclined disposition directly behind said forward transverse axis of rotation, a groove-tracking roller mounted to said rear end of said body for rotation about a rear transverse axis of rotation that is parallel to said forward transverse axis of rotation, and said groove-tracking roller includes an annular, rotatable groove-tracking guide that is wider than said seam-following guide, a metal rear-end grooving blade defining a longitudinally aligned, concave upwardly facing scoop having a concave cutting edge at its lower tip, and said rear-end grooving blade is secured to said body and is located behind said groove-tracking guide and is oriented in an upwardly and forwardly inclined disposition behind said rear transverse axis of rotation in longitudinal alignment with said groove-tracking guide, with said cutting edge of said rear-end grooving blade projecting rearwardly beyond said rear end of said body.

14. A floor groover according to claim 13 wherein said rollers and said grooving blades are detachable from said body.

15. A floor groover according to claim 14 wherein said body is hollow and defines an internal material-channeling duct leading upwardly and rearwardly from said seam-following guide and an internal longitudinal material discharge cavity extending rearwardly from said material-channeling duct and defining a discharge opening in said rear end of said hollow body.

* * * * *